(12) United States Patent
Geider

(10) Patent No.: US 10,814,851 B2
(45) Date of Patent: Oct. 27, 2020

(54) BRAKE MASTER CYLINDER ARRANGEMENT WITH POSITION TRANSMITTER ELEMENT AND COUPLING ARRANGEMENT THEREFOR

(71) Applicant: Lucas Automotive GmbH, Koblenz (DE)

(72) Inventor: Michael Geider, Urmitz (DE)

(73) Assignee: ZF Active Safety GmbH, Koblenz (DE)

(*) Notice: Subject to any disclaimer, the term of this patent is extended or adjusted under 35 U.S.C. 154(b) by 0 days.

(21) Appl. No.: 16/467,449

(22) PCT Filed: Oct. 17, 2017

(86) PCT No.: PCT/EP2017/076420
§ 371 (c)(1),
(2) Date: Jun. 6, 2019

(87) PCT Pub. No.: WO2018/103930
PCT Pub. Date: Jun. 14, 2018

(65) Prior Publication Data
US 2020/0070794 A1    Mar. 5, 2020

(30) Foreign Application Priority Data
Dec. 6, 2016 (DE) .................. 10 2016 014 483

(51) Int. Cl.
*B60T 11/20* (2006.01)
*B60T 17/22* (2006.01)

(52) U.S. Cl.
CPC ............ *B60T 11/20* (2013.01); *B60T 17/221* (2013.01)

(58) Field of Classification Search
CPC ........ B60T 11/20; B60T 17/221; B60T 17/18; B60T 11/16
See application file for complete search history.

(56) References Cited

U.S. PATENT DOCUMENTS 4,620,750 A * 11/1986 Leiber ..................... B60T 8/266
                                                              303/113.4
4,824,186 A    4/1989 Leiber et al.
(Continued)

FOREIGN PATENT DOCUMENTS

DE    3723916 A1    1/1989
DE    3723842 A1    2/1989
(Continued)

OTHER PUBLICATIONS

German Search Report, Application No. 10 2016 014 483.1 dated Jul. 26, 2017.
(Continued)

*Primary Examiner* — Thomas E Lazo
(74) *Attorney, Agent, or Firm* — MacMillan, Sobanski & Todd, LLC

(57) ABSTRACT

The invention relates to a brake master cylinder arrangement for a motor vehicle brake system, comprising at least one piston arrangement with: a pressure piston unit that can be moved along a movement axis (V) and, together with a housing arrangement of the brake master cylinder arrangement, defines a pressure chamber; and a force input member that can be moved according to the actuation of the brake pedal and is coupled, or can be coupled, to the pressure piston unit so as to move therewith, the brake master cylinder also comprising: a position transmitter element that can be moved according to the actuation of the force input member; a detection unit designed to detect a movement of the position transmitter element; and a coupling arrangement designed to couple the position transmitter element to at least one element of the piston arrangement in a substantially rigid manner, along the movement axis (V), the coupling arrangement also being designed to allow a rotation of the at least one element of the piston arrangement in (Continued)

relation to the position transmitter element about the movement axis (V).

12 Claims, 11 Drawing Sheets

(56) References Cited

U.S. PATENT DOCUMENTS

| | | | |
|---|---|---|---|
| 5,098,171 A | | 3/1992 | Siegel |
| 5,201,573 A | * | 4/1993 | Leiber .................. B60T 8/26 303/113.4 |
| 6,033,035 A | * | 3/2000 | Neumann ............ B60T 7/042 303/113.4 |
| 9,446,745 B2 | | 9/2016 | Elliott et al. |
| 9,797,417 B2 | * | 10/2017 | Giese .................. B60T 17/22 |
| 2016/0272173 A1 | | 9/2016 | Shin et al. |
| 2016/0369824 A1 | | 12/2016 | Shiwa |

FOREIGN PATENT DOCUMENTS

| | | |
|---|---|---|
| DE | 3842225 A1 | 6/1990 |
| DE | 3928874 C1 | 1/1991 |
| DE | 10137602 A1 | 3/2003 |
| DE | 102997032756 A1 | 1/2009 |
| DE | 102008020934 A1 | 10/2009 |
| DE | 102012022519 A1 | 5/2014 |
| DE | 102016207839 A1 | 12/2016 |
| EP | 2407361 A1 | 1/2012 |
| FR | 2535662 A1 | 5/1984 |
| GB | 2128279 A | 4/1984 |

OTHER PUBLICATIONS

PCT International Search Report and Written Opinion, Application No. PCT/EP2017/076420, dated Jan. 23, 2018.

* cited by examiner

BRAKE MASTER CYLINDER ARRANGEMENT WITH POSITION TRANSMITTER ELEMENT AND COUPLING ARRANGEMENT THEREFOR

CROSS-REFERENCE TO RELATED APPLICATIONS

This application is the National Phase of International Application PCT/EP2017/076420 filed Oct. 17, 2017 which designated the U.S. and that International Application was published on Jun. 14, 2018 as International Publication Number WO 2018/103930 A1. PCT/EP2017/076420 claims priority to German Application No. 10 2016 014 483.1, filed Dec. 6, 2016. Thus, the subject nonprovisional application claims priority to DE 10 2016 014 483.1, filed Dec. 6, 2016. The disclosures of both applications are incorporated herein by reference.

BACKGROUND OF THE INVENTION

The present disclosure relates generally to the technical field of brake master cylinder arrangements and in particular brake master cylinder arrangements for motor vehicle brake systems. More precisely, the present disclosure relates to a brake master cylinder arrangement in which a brake pedal actuation is detectable by means of a position sensor element.

Solutions for detecting a brake pedal actuation are known from the prior art. Detection of this kind is necessary, for example, to detect the presence of a desire by the driver in respect of vehicle braking and if applicable also the desired extent of the vehicle braking. This information can be used to determine the brake forces to be provided in a braking operation decoupled from the driver (brake-by-wire). Such brake forces are typically generated via an electromechanical brake actuator.

It is further known in this context to provide a position sensor element, which can be moved according to the brake pedal actuation, wherein this movement is detected by means of a detection unit. Rod-shaped position sensor elements, for example, which are coupled to the piston of a brake master cylinder for common movement, can be considered for this.

Examples of this are given in the documents DE 10 2008 020 934 A1, DE 37 23 842 A1 or DE 37 23 916 A1.

However, it has been shown that malfunctions can easily occur in the known solutions and that a desired reliability is often not achieved.

SUMMARY OF THE INVENTION

A brake master cylinder arrangement is to be specified that facilitates reliable detection of a brake pedal actuation.

There is provided for this a brake master cylinder arrangement for a motor vehicle brake system, comprising at least one piston arrangement with:
  a pressure piston unit, which can be moved along a movement axis and delimits a pressure chamber together with a housing arrangement of the brake master cylinder arrangement,
  a force input member, which can be moved according to an actuation of a brake pedal and is coupled or can be coupled to the pressure piston unit for common movement.

The brake master cylinder arrangement further comprises:
  a position sensor element, which can be moved according to an actuation of the force input member;
  a detection unit, which is configured to detect a movement of the position sensor element; and
  a coupling arrangement, which is configured to couple the position sensor element to at least one element of the piston arrangement along the movement axis in a substantially rigid manner, wherein the coupling arrangement is further adapted to permit a rotation of the at least one element of the piston arrangement relative to the position sensor element about the movement axis.

The pressure piston unit can comprise a piston, for example in the form of a pressure and/or brake piston, which is guided movably in a cylinder bore of the brake master cylinder arrangement. The housing arrangement can comprise a cylinder housing of the brake master cylinder arrangement. The pressure piston unit and the cylinder bore (and/or the cylinder housing) can jointly delimit the pressure chamber. The volume of the pressure chamber can be varied according to a movement of the piston, so that a pressure on the pedal counterforce simulator or, in the event of a system failure, a brake pressure directly in a hydraulic brake circuit coupled to the brake master cylinder arrangement can be changed in a known manner.

It is understood that the brake master cylinder arrangement can also comprise several such pressure piston units, which are arranged, for example, according to a tandem design. These can also define a corresponding plurality of pressure chambers.

The pressure piston unit can be constructed in several parts. For example, the pressure piston unit can comprise a substantially cylindrical piston. This can be movable, at least in sections, directly into the pressure chamber and/or out of this. Other elements of the pressure piston unit can be mounted on the piston, for example a locating bush for a connecting section of the force input member and/or a carrier element (for example, a carrier plate). These elements can be arranged at least partly in a cylindrical blind hole or recess in the piston. The carrier element can further protrude generally radially from the piston, for example to form a region of the pressure piston unit lying axially opposite the position sensor element.

The force input element can be configured as a generally cylindrical element and/or like a piston. The coupling to the pressure piston unit can be realised in a force-locking and/or form-locking manner (for example, by caulking or common abutment). An at least indirect mechanical coupling can also take place to the brake pedal. In general the force input member can likewise be movable along the movement axis, wherein it can convert a brake pedal actuation into a movement of the pressure piston unit along the movement axis.

The position sensor element can be configured as a generally elongated and/or cylindrical element. According to one example, the position sensor element is substantially rod-shaped and/or formed, at least in sections, with a rounded, oval or circular cross section. The position sensor element can also be described as a position sensor rod or sensor pin. At a higher level the position sensor element can comprise a metal and in particular a magnetic material and/or generally be adapted to interact with the detection unit for a position recognition. The detection unit can comprise a magnetic field sensor for this.

The position sensor element can be couplable or coupled to the pressure piston unit or the force input member, in order to be moved together with this. This can take place via the coupling arrangement explained below. The movement of the position sensor element can likewise take place substantially along the movement axis. In particular, the position sensor element can be moved along an axis that is spaced at a distance from the movement axis, but is parallel to this.

The detection unit can detect the movements of the position sensor element by means of a suitable sensor unit, for example a magnetic field sensor unit, comprising a Hall sensor. The detection unit can further be covered by an electromechanical brake actuator unit or interact with this. In particular, the detection unit can be part of a sensor unit for detecting an operating parameter of the brake actuator unit, such as, for example, a current position of an electric motor of this unit. The detection unit can be generally configured to generate signals according to the movement of the position sensor element. These can be evaluated by a control unit. The control unit can be covered by the detection unit or can at least be connectable to this.

The coupling arrangement can generally form a unit interposed between the position sensor element and the at least one element of the piston arrangement. In particular, this can involve a mechanical interposing or interpositioning, so that the piston arrangement and the position sensor element are indirectly connected via the coupling arrangement. Apart from the coupling arrangement, there can be provided substantially no other indirect and/or direct mechanical couplings between the position sensor element and the piston arrangement.

In addition or alternatively, a force transmission can take place between the piston arrangement and the position sensor element for common movement substantially via the coupling arrangement and in particular substantially exclusively via the coupling arrangement.

The coupling arrangement can comprise and/or form an assembly configured separately from the piston arrangement and/or that can be handled separately. This can be connectable to the at least one element of the piston arrangement and can be fastened, for example, directly thereto.

For example, the coupling arrangement can comprise a separately configured element, which can be connected to the piston arrangement and which optionally comprises at least one of the first and second sections explained below. In addition or alternatively, the coupling arrangement and its possible separately configured element can be formed in one piece and in particular be manufactured from a sheet metal material (for example as a sheet metal bent part or punched part).

The axially rigid coupling of position sensor element and piston arrangement can relate to a limitation or substantially complete suppression of an axial relative movement between said elements along the movement axis. Expressed another way, the coupling arrangement can be configured so that the position detection element and the piston arrangement are movable jointly along the movement axis without significant axial relative movements or axial play occurring between these elements.

Conversely, the coupling arrangement can be configured to facilitate a relative rotation between position sensor element and piston arrangement about the movement axis. In a rotation about the movement axis, the piston arrangement can therefore slide, so to speak, relative to the coupling arrangement without a significant transmission of this rotation movement taking place to the position sensor element, whereby a radial force load on the position sensor element due to rotation is reduced or prevented.

Expressed another way, the coupling arrangement can substantially decouple the position sensor element and the piston arrangement in rotatory terms, wherein this relates in particular to a rotation about the movement axis. The coupling arrangement can thus be generally configured to transfer substantially only axial forces between said elements, but not rotation forces about the movement axis.

As explained in greater detail below, the coupling arrangement can interact in particular with a carrier element of the pressure piston unit and/or a free end of the position sensor element for coupling of the relevant elements.

According to another embodiment, the coupling arrangement comprises a first section, which is configured to couple the coupling arrangement to the at least one element of the piston arrangement. The coupling can relate to a direct and/or mechanical coupling. The first section can be couplable in particular axially to the element of the piston arrangement, in particular in an axially rigid manner. Viewed around the movement axis, however, the first section can be decoupled in rotatory terms from the piston arrangement, in spite of a possible axially rigid coupling hereto.

In other words, the first section can provide the rotatory degree of freedom between the position sensor element and the element of the piston arrangement at least proportionally, for the most part or substantially completely. In addition or alternatively, the first section can provide the axially rigid coupling between the position sensor element and the element of the piston arrangement at least proportionally, for the most part or substantially completely.

The first section can further be configured to interact with a coupling surface of the piston arrangement and in particular to slide relative to this. The coupling surface can be covered by a coupling region of the piston arrangement or can form this. The sliding can relate to a sliding along and/or on the coupling surface (in particular wherein the coupling surface is moved and the first section remains substantially stationary). In addition or alternatively, this can relate to a relative sliding in a circumferential direction of the at least one element of the piston arrangement, wherein the circumferential direction can run around the movement axis.

In the scope of the present disclosure, the terms axial and radial can refer to the movement axis. The circumferential direction can relate, however, to a direction or extension about the movement axis, in particular within a plane orthogonal to this axis.

The coupling surface can be provided on an external circumferential surface of the pressure piston unit, for example. This can relate in particular to an external circumferential surface of the piston and/or of a possible carrier element. The coupling surface can define an annular region. This can extend substantially parallel to as well as around the movement axis. The coupling surface can also be inclined relative to the movement axis, thus define a conical annular section, for example. In general the coupling surface can progress substantially continuously and/or smoothly. For example, the coupling surface can be substantially free of regions or structures that could obstruct a possible relative sliding of the first section.

The coupling surface can be configured in a region of the piston arrangement that has a larger diameter than a section of the piston arrangement delimiting the pressure chamber. The region can lie axially opposite a free end of the position sensor element, for example to make coupling to this easier. The coupling surface can be formed on an external circumferential surface of said region.

Furthermore, said region with an enlarged diameter can be provided by a carrier plate or a comparable carrier element, which protrudes radially beyond the diameter of the piston arrangement. On a higher level, the coupling surface can be configured on a carrier element, which is arranged on an end region of the piston arrangement facing away from the pressure chamber. The carrier element can be formed as a carrier plate and/or provide a contact surface for a reset spring of the piston arrangement. The carrier element can further form an axial end element of the piston arrangement (thus define an axial end region of this, for example). The carrier element can further face an input opening for the force input member and/or lie axially opposite this.

A development provides that at least one of the first section and the coupling surface is configured with a recess, into which the respectively other of the first section and the coupling surface is at least partially received, and in particular wherein the recess comprises a groove running in a circumferential direction. The recess can define a guide axis for a sliding of the coupling arrangement and/or generally a guide axis for the relative rotation between position sensor element and piston arrangement by means of the coupling arrangement. The recess can be generally elongated and/or substantially suppress axial relative movements between the first section and the coupling surface. Expressed otherwise, the recess can be adapted to connect the first section and the coupling surface to one another substantially play-free axially. On the other hand, a rotation in a circumferential direction (or about the movement axis) can be permitted, in particular by a relative sliding between the recess and the section taken up therein.

According to one variant, the recess is provided as a groove running in a circumferential direction, which can be configured in particular continuously or completely circumferential, so that a complete rotation about the movement axis is facilitated. Expressed another way, the recess can be configured so that a relative twisting of at least 360° about the movement axis is enabled between the first section and the coupling surface. For example, the recess can define a substantially annular depression.

In the case that the recess is formed in the first section, it can be an internally circumferential recess or groove, which faces the movement axis, for example. If, on the other hand, the recess is formed in the coupling surface, it can be an externally circumferential recess or groove, which faces away from the movement axis, for example.

For coupling to the recess, the respectively other element of the first section and coupling surface can comprise a protruding region, in particular radially protruding. This can be capable of being brought into engagement with the recess and be guided or slide along this (in particular in a circumferential direction and/or about the movement axis). This takes place preferably with an axially play-free coupling between these elements. In other words, the recess can generally provide an axial form lock between the piston arrangement and the coupling arrangement.

A development provides that the first section is or can be coupled to the piston arrangement with an elastic deformation. The first section can thus sustain a certain elastic degree of deformation even in the mounted state. As a result of elastic reset forces, the first section can be kept in a defined manner on the piston arrangement. For example, defined friction forces can be set between said elements via this, in particular to influence a possible rotatory relative movement between these. It can also be provided, however, that the elastic deformation only occurs in the assembly process and following completed assembly the coupling arrangement is coupled substantially in an undeformed state to the piston arrangement.

The first section can comprise an annular region or be configured as such, wherein the annular region spans an angular range of at least approx. 120°. The annular region can extend around the movement axis and/or an external circumferential surface of the coupling arrangement. The angular range can refer to an angular range around or related to the movement axis. The annular region can be completely or virtually closed. For example, the annular region can comprise a circumferential opening of not more than approx. 180°, not more than approx. 90° or not more than approx. 30°. Otherwise expressed, the angular range can span at least approx. 180°, approx. 270° or approx. 330°.

The coupling arrangement can comprise a second section, which is configured to couple the coupling arrangement to the position sensor element. The second section can merge substantially directly into the first section or overlap with this at least partially or completely. The first and/or the second section can each also comprise several individual regions, which are not directly linked. For example, there can be provided on the coupling arrangement several regions, which together act as a second section of the coupling arrangement for coupling to the position sensor element. The same applies to the first section.

The second section can be angled from the first section and/or protrude from this. For example, the second section can protrude axially and/or radially from the first section. According to one variant, the second section extends, starting out from the first section, in the direction of the position sensor element and or the pressure chamber of the brake master cylinder arrangement. The first and second section can further be covered or formed by a one-piece component.

According to one variant, the second section is configured to form a form lock with the position sensor element. To this end the second section can provide, for example, an undercut, a latching region, a clamping section and/or an opening, in order to interact with the position sensor element and in particular to engage with this. In this context the form lock can in particular limit or substantially completely suppress an axial relative movement of coupling arrangement and position sensor element. Otherwise expressed, the form lock can be provided in such a way that the coupling of position sensor element and coupling arrangement takes place substantially axially play-free and/or axially immovably. The form lock can also take place radially and/or in a circumferential or rotation direction about the movement axis.

In addition or alternatively, the second section can be configured to form a force fit with the position detection element. This can be achieved, for example, in that a coupling of the second section to the position detection element takes place with elastic deformation of at least one of a second section in the position sensor element (for example, in the course of latching).

For example, the position sensor element can be coupled or couplable to the coupling arrangement with an at least local elastic deformation of the second section. For example, a free end of the position sensor element can have a larger cross section dimension (for example, a larger diameter) than a receiving region of the second section, so that the latter is elastically deformed. Friction forces can be generated via this, which can act in particular permanently for a reliable coupling. It can further be provided in this context that the widened region, after an axial introduction of the position sensor element, springs back at least partially and via this creates a form-locking latching connection to the free end of the position sensor element.

The force fit can be accompanied by friction forces, which support an axially play-free coupling and/or relative axial immobility between the second section and position sensor element. On a higher level, both a possible form lock and a possible force fit can take place in such a way that the second section and the position sensor element are coupled substantially play-free and/or are immovable relative to one another in a rotation direction about the movement axis.

Finally, the coupling arrangement and in particular a possible second section of this can pretension the position sensor element against the at least one element of the piston arrangement. This can take place in that a coupling of coupling arrangement and position sensor element takes place with elastic deformation (in particular by the coupling arrangement). The pretensioning can be achieved in particular by means of reset forces acting axially on the position sensor element, which forces are generated, for example, as a consequence of an elastic deformation of the coupling arrangement. In general, the position sensor element according to this variant can be pushed into contact or held in contact with the element of the piston arrangement (for example a carrier plate). An axial play and/or an axial relative movement between the position sensor element and the piston arrangement can also be prevented by this.

A development provides that the second section protrudes axially compared with the first section or that the second section is formed by a receiving region in the first section. For example, the first section can have an axial depression, an axial recess, an axial blind hole and/or a latching region extending substantially axially, which can each form the second section. On the other hand, the second section can extend starting out from the first section, in particular in the direction of the position sensor element or of the pressure chamber.

On a higher level, it can further be provided that the coupling arrangement is configured so that a maximal radial extension of the piston arrangement (for example, a maximum diameter of this) is exceeded by not more than approx. 25%, not more than approx. 10% or not more than approx. 5%. In other words, the coupling arrangement can be configured to protrude only slightly or even not at all radially from the piston arrangement.

The position sensor element can be couplable to the second section at least according to one of the following variants:

axial movement into the second section; and radial movement into the second section.

To simplify assembly, it can be provided that only one of an axial and radial movement inwards takes place or that only a single process of moving inwards of these movements combined takes place. This can limit the number of required assembly steps.

The coupling arrangement can further generally comprise a fastening element, in particular to couple the position sensor element permanently to the coupling arrangement. This can be configured separately from the first and second section and can for example be connectable selectively to the second section. The fastening element can be a fastening clip, a fastening pin or similar. The fastening element can exert a fastening force, for example to fasten the second section and the position sensor element to one another or to brace them against one another. In addition or alternatively, a form lock can be created and/or strengthened between the second section and the position sensor element under the influence of the fastening element. For example, the fastening element can be adapted to exert such a fastening force that the second section engages with the position sensor element and/or is held in engagement with this. The second section and/or the position sensor element can also be elastically deformed at least locally under the influence of the fastening element.

The position sensor element can further comprise an end section, which is configured to interact with the second section of the coupling arrangement. The end section can comprise a free end or a free end region of the position sensor element or be formed by this. This end region can comprise a diameter step, in order to be coupled to the second section. In the event that the position sensor element is formed rod-shaped, the free end section can comprise in particular an end of the position sensor element facing away from the detection unit.

The end section can further come into abutment with a predetermined region of the coupling arrangement or of the at least one element of the piston arrangement. This can additionally secure the axial position of the position sensor element. To this end an end piece, for example, of the end section, which can follow a diameter step in the end section, can be brought into such abutment. Furthermore, this abutment can be supported by exertion of forces on the position sensor element and/or the coupling arrangement or piston arrangement. For this the coupling arrangement can be elastically deformed, for example in a predetermined manner, in order to generate reset forces, which push the position sensor element into a corresponding abutment.

It can further be provided that the second section spans the end section at least partially axially. In other words, the second section can extend axially along the end section and/or take this up at least partially. For example, the second section can run at least partially axially parallel to the end section and/or also radially to this. This can also be achieved via different regions or subsections of the second section.

For example, the second section can comprise a subsection extending substantially axially and a subsection extending substantially radially. In this case the axial subsection can merge into the second section of the coupling arrangement and the radial subsection can be angled from the axial subsection, in particular in the direction of the end section of the position sensor element. In this case the end section can be axially spanned at least by the axial subsection.

Various aspects of this invention will become apparent to those skilled in the art from the following detailed description of the preferred embodiment, when read in light of the accompanying drawings.

DETAILED DESCRIPTION OF THE PREFERRED EMBODIMENTS

Figure 1:
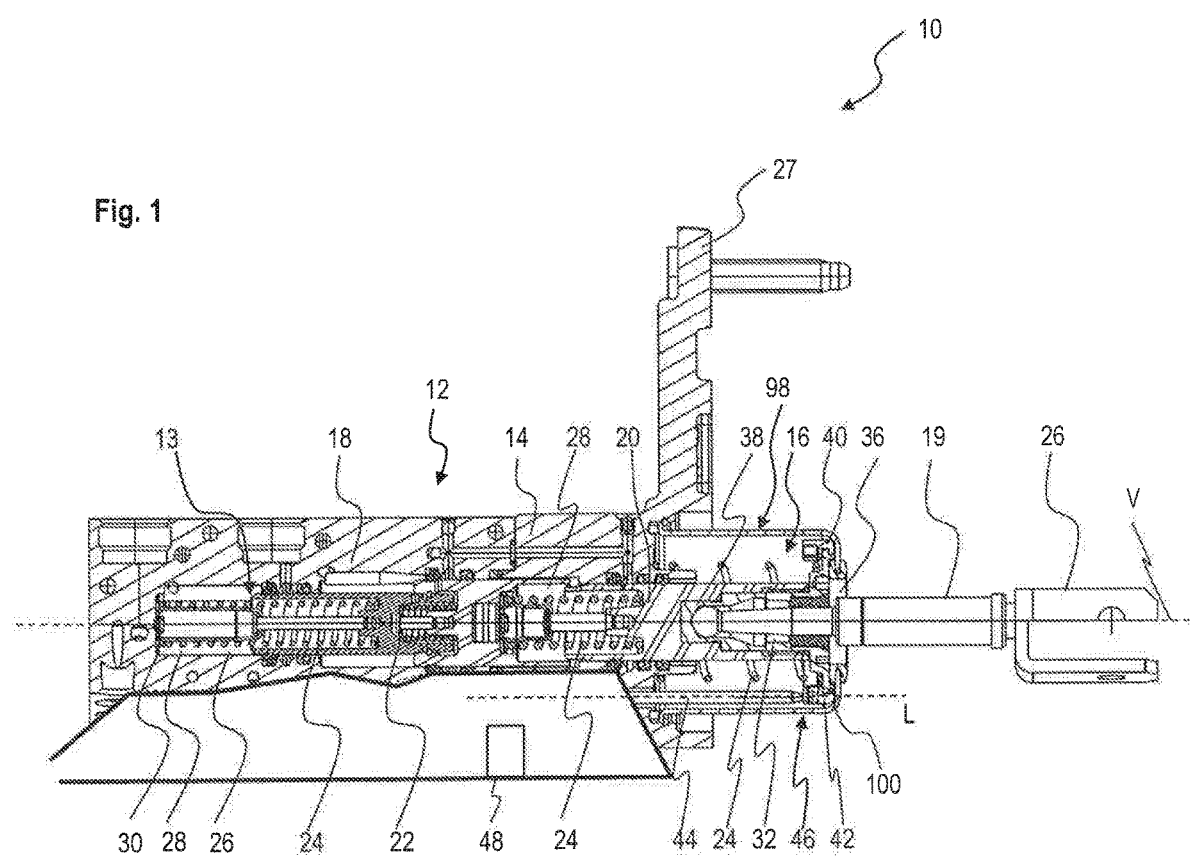
FIG. 1 a sectional view through a brake master cylinder arrangement according to the invention.

In FIG. 1 there is shown a brake master cylinder arrangement 10 according to the invention in a sectional view containing a movement axis V. The brake master cylinder arrangement 10 comprises a housing arrangement 12, which receives a piston arrangement 13. In the exemplary embodiment shown, the housing arrangement 12 comprises a first housing part 14, which is configured cylindrically in sections and which provides an input chamber 16 for a force input member 19. The first housing part 14 is configured as an element that can be handled separately from a second housing part 18, but is screwed fixedly to this. Finally, a fastening region 27 is formed on the first housing part 14 for fastening the brake master cylinder arrangement 10 in the engine compartment of a vehicle.

The piston arrangement 13 comprises a first piston 20, which is coupled to the force input member 19. The piston arrangement 13 further comprises a second piston 22, which is coupled to the first piston 20 via a reset spring 24 among other things. The pistons 20, 24 each delimit a pressure chamber 28 with a cylinder bore 26 extending axially along the movement axis V. The pressure chambers 28 can each be coupled in a known manner to a pedal counterforce simulator, a brake fluid reservoir or in the event of a system failure directly to a brake circuit of a motor vehicle (not shown).

In FIG. 1 it is further recognised that the force input member 19 is configured as a multipart piston-shaped element. At its end facing away from the first housing part 14, the force input member 19 comprises a coupling section 26 for coupling to a brake pedal, which is not shown. As explained in detail below, the force input member 19 can further be moved along a movement axis V relative to the housing arrangement 12 and is in particular insertable into the first housing part 14 and withdrawable from this.

The force input member 19 extends through an input opening 36 of the first housing part 14 into an axial blind hole 32 in the first piston 20, wherein the blind hole 32 faces the input opening 36. In the blind hole 32, an end of the force input member 19 facing the first piston 20 is caulked with a receiving sleeve 38 of the first piston 20. A displacement movement of the force input member 19 is consequently transferable to the first and via the reset spring 24 also to the second piston 20, 22.

Furthermore, there is screwed into the blind hole 32 a carrier element in the form of a carrier plate 40. This has a greater external diameter than the first piston 20, but also than the second piston 22 or the cylinder bore 26. Between the carrier plate 40 and an opposing end face region of the first housing part 14 there is arranged a further reset spring 24. This receives the first piston 20 substantially coaxially and extends along the movement axis V.

FIG. 1 shows the brake master cylinder arrangement 10 in a starting position or, expressed another way, in a brake-inactive resting position. To generate brake forces, the force input member 19 is moved according to a brake pedal actuation to the left in FIG. 1 along the movement axis V. In this case the pistons 20, 22 shift inside the cylinder bore 26 and reduce the volume of the respectively associated pressure chambers 28. Furthermore, the reset springs 24 are compressed in the process. If the driver does not exert any more actuation force on the brake pedal or the force input member 19, the reset springs 24 push the pistons 20, 22 back into their starting position again.

In the exemplary embodiment shown, the piston arrangement 13 comprises the two pistons 20, 22 and the force input member 19 and the reset springs 24 positioned in between. Overall the piston arrangement 13 is further configured in a known manner according to the tandem-cylinder design. The actual pressure piston unit of the piston arrangement 13 comprises, on the other hand, only the pistons 20, 22, wherein the first piston 20 is configured in multiple parts and further comprises the carrier plate 40 described above.

As explained in greater detail below, there is further arranged on the carrier plate 40 a coupling arrangement 42, via which it is coupled to a rod-shaped position sensor element 44. The position sensor element 44 has a longitudinal axis L, which extends parallel to the movement axis V. Furthermore, the position sensor element 44 has a substantially circular cross section with a diameter that varies in the end regions.

In FIG. 1 the brake master cylinder arrangement 10 and in particular the position sensor element 44 are not completely depicted. However, a first free end section 46 of the position sensor element 44 is recognised, which section interacts with the coupling arrangement 42. Starting out from this, the position sensor element 44 extends in a straight line along the longitudinal axis L. A second end section 47 (see FIG. 2A) of the position sensor element 44 lying opposite the first end section 46 is designed to be coupled in a mechanically play-free manner to a detection unit connected in series. Movements of the second end section can therefore be detected in a known manner by a schematically indicated detection unit 48, which comprises a magnetic field sensor (for example a Hall sensor).

In summary it is thus possible to detect movements of the position sensor element 44 by means of the detection unit 48. These movements of the position sensor element 44 indicate, due to the coupling to the piston arrangement 13 or the force input member 19 via the carrier plate 40, for example, a brake pedal actuation by the driver. Expressed another way, a brake pedal actuation is accompanied by a displacement of the force input member 19 and the piston arrangement 13 coupled thereto to the left in FIG. 1 along the movement axis V. At the same time, the position sensor element 44 is moved via the carrier plate 40 to the left according to this displacement, wherein the shift of the second end section 47 (see FIG. 2A) along the movement axis V is detected by the detection unit 48. This information can be evaluated in a known manner by control units, which are not shown, in order to deduce the presence and the extent of a braking desire of the driver.

To increase the accuracy of the position and pedal actuation detection, the position sensor element 44 and the carrier plate 40 are coupled to one another according to the example shown in a substantially axially rigid or, expressed another way, axially play-free manner. This is achieved via the coupling arrangement 42 explained below. This is configured to suppress substantially completely an axial relative movement between the position sensor element 44 and the carrier plate 40.

During operation of the brake master cylinder arrangement 10 it can occur, however, that components of the piston arrangement 13 rotate about the movement axis V. This relates in particular to the pistons 20, 22, wherein this rotation is also transferred to the carrier plate 40. It was recognised that as a consequence of these rotations, a mechanical connection between the position sensor element 44 and the carrier plate 40 was hitherto often loaded excessively heavily. This reduced the reliability, as damage caused by shear force to the guide of the position sensor element 44 or other malfunctions could occur, for example (for example, bending of the position sensor element 44). The probability of such malfunctions can be reduced by the coupling arrangements 42 of the exemplary embodiments explained below. These exemplary embodiments are based respectively on the basic construction according to FIG. 1 and relate respectively to particular configurations of, for example, the coupling arrangement 42.

Figure 2A:
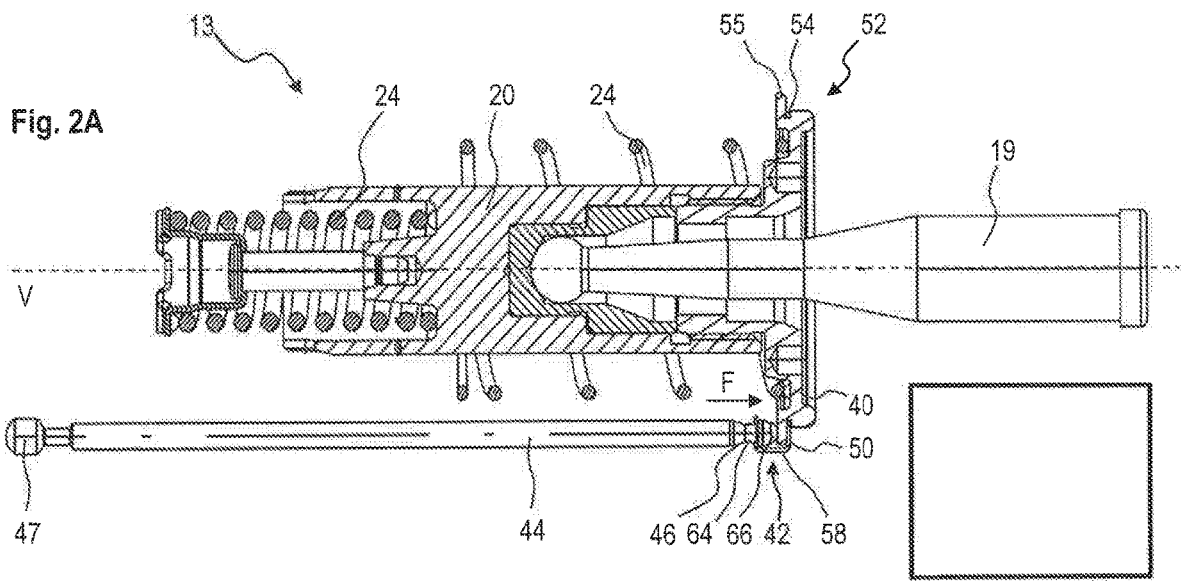
FIGS. 2A-C are views showing a coupling arrangement according to a first exemplary embodiment.
Figure 2B:
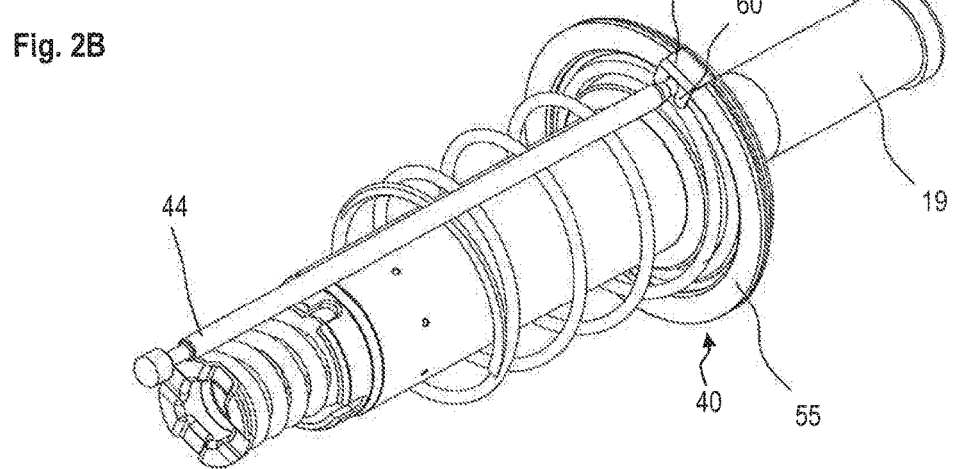
Figure 2C:
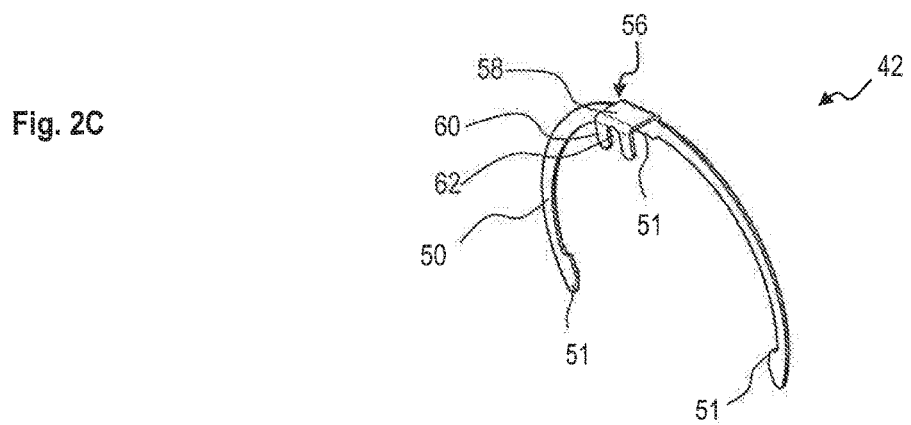

A first exemplary embodiment is shown in FIGS. 2A-C. FIG. 2A shows only a part of a brake master cylinder arrangement 10, which is configured by analogy with the example in FIG. 1. Here FIG. 2A shows a partial sectional view of this part, whereas FIG. 2B contains a perspective depiction of this. The first piston 20, for example, is recognised as well as the associated reset springs 24. Furthermore, the force input member 19 and the carrier plate 40 coupled to the piston 20 are shown again. The position sensor element 44 and the coupling arrangement 42 between the carrier plate 40 and the position sensor element 44 are also shown.

It is recognised that the carrier plate 40 forms a radially protruding region of the piston arrangement 13 and has a larger diameter than the first piston 20, which delimits the pressure chamber 28. The diameter of the carrier plate 40 is chosen so that this lies axially opposite the first end section 46 of the position sensor element 44. Starting out from the input opening 36 (see FIG. 1), which is not shown in FIG. 2A, and viewed in a brake-active movement direction, the carrier plate 40 is connected here upstream of the position sensor element 44, so that it can move this in the manner described above by transmission of pressure forces. In a movement into a brake-inactive position (thus to the right in FIG. 1), on the other hand, tractive forces are transferred by means of the carrier plate 40 to the position sensor element 44, in order to move this back into the starting position shown in FIG. 1 again. The transfer of these forces takes place here by means of the coupling arrangement 42. This is formed as a one-piece sheet metal bent part.

FIG. 2C shows the coupling arrangement 42 in an individual perspective depiction. A first section 50 is recognised, which forms an open annular region. The annular region spans an angular range of approx. 270° or, in other words, is open in a circumferential direction over an angular range of approx. 90°. By means of this first section 50 the coupling arrangement 42 can be coupled to the carrier plate 40. To this end the first section 50 comprises at its respective free ends two sections 51 facing one another and protruding radially inwards. These are received in a recess 54 of the carrier plate 40 explained below.

More precisely the carrier plate 40 comprises a coupling surface 52 (see FIG. 2A) running circumferentially around the movement axis V but facing away from this. The coupling surface 52 comprises in turn a recess 54, which is configured as a groove running around the movement axis V. In other words, the recess 54 provides a radial depression region running annularly in a circumferential direction within the coupling surface 52. The first section 50 of the coupling arrangement 42 can be received at least partially in this recess 54. In the assembled state according to FIG. 2A, the first section 50 of the coupling arrangement 42 accordingly extends likewise around the movement axis V along the recess 54.

An axial extension of the recess 54 is further dimensioned so that the first section 50 is arranged therein axially free of play. This prevents axial relative movements between the carrier plate 40 and the coupling arrangement 42. In addition, there is provided between the recess 54 and the position sensor element 44 a diameter step 55 of the carrier plate 40, which diameter step extends starting out from the recess 54. This provides an axial stop region for the second section 50 of the coupling arrangement 42. Prevention of an axial relative movement between the coupling arrangement 42 and the carrier plate 40 is additionally supported by this, at least in a brake-active movement to the left in FIG. 2A.

In arranging of the coupling arrangement 42 on the carrier plate 40, the first section 50 is pushed radially inwards onto the carrier plate 40. In doing this the first section 50 is elastically widened and in particular fits closely on the base of the recess 54 by way of the sections 51 protruding radially inwards. There is also a corresponding section 51 protruding radially inwards in the region of a second section 56 explained below. Due to the elastic deformation of the first section 50, defined friction forces are generated between the respective sections 51 protruding radially inwards and the carrier plate 40. The rotatability of the coupling arrangement 42 about the movement axis V, which is explained below, can be set in a defined manner via this.

Returning to FIG. 2C, a second section 56 of the coupling arrangement 42 is also recognised. The second section 56 comprises a first axial subsection 58, which extends starting out from the first section 50 parallel to the movement axis V in the direction of the position sensor element 44 (see FIG. 2A). In doing so the axial subsection 58 at least partially spans the first end section 46 of the position sensor element 44. The axial subsection 58 merges into a radial subsection 60. Starting out from the axial subsection 58, this extends radially inwards or radially towards the inside (thus in the direction of the movement axis V). The radial subsection 60 comprises a recess 62 that opens radially inwardly.

As can be recognised when looking at FIGS. 2A-C overall, the first end section 46 further comprises a region 64 with a reduced diameter, which merges into an end piece 66 with an enlarged diameter. A diameter step is thus provided within the first end section. This can be inserted radially into the recess 62 of the second section 56 of the coupling arrangement 42. The end section 66 thereby comes into abutment with a side of the radial subsection 60 facing the carrier plate 40. A form lock is formed by this, which suppresses an axial relative shift between the coupling arrangement 42 and the position sensor element 44.

It is further recognised in FIG. 2A that the end piece 66 of the end section 46 of the position sensor element 44 abuts a side of the carrier plate 40 facing the position sensor element 44. The second section 56 of the coupling arrangement 42 and in particular its axial subsection 58 is dimensioned in this case so that this is slightly deformed elastically as a consequence of coupling to the end section 46. Specifically the axial subsection is slightly bent, so that the recess 62 of the radial subsection 60 can be guided over the end piece 66 of the position sensor element 44. A reset force F consequently arises, which pulls the position sensor element 44 to the carrier plate 40 and braces it against this. This contributes to an axially play-free and even axially rigid coupling of carrier plate 40 and position sensor element 44. The abutment of the end piece 66 on the carrier plate 40 does not prevent a rotation, explained below, relative to the carrier plate 40 about the movement axis V, however. Instead, the forces above which such a relative rotation (or a relative sliding) is facilitated can be set specifically via this. It should also be pointed out that the present exemplary embodiment can be implemented even without such an abutment of the end piece 66 on the carrier plate 40 and/or the bracing accompanying this. To this end only the dimensions of the axial subsection 58 and/or of the end piece 66 must be adapted accordingly.

To improve reliability, it is further provided in the present exemplary embodiment that the second section 50 is movable along the recess 54 and can thus slide in a circumferential direction on the coupling surface 52. This is accompanied by a relative rotation between the coupling section 42 and the piston arrangement 13 (or the carrier plate 40) about the movement axis V. If a rotation of the carrier plate 40 about the movement axis V occurs accordingly during operation, the coupling section 42 and thus also the position sensor element 44 can remain in a substantially constant angular position about the movement axis V, as the carrier plate 40 is largely decoupled from the coupling section 42 in rotatory terms.

This can be further supported in that the position sensor element 44 is held in an axial guide sleeve or bushing, which is not depicted. If a rotation of the carrier plate 40 occurs, this can slide around the movement axis V relative to the substantially fixed coupling section 42 without the rotation forces acting in this case being able to affect the position sensor element 44 or the coupling section 42 with displacement effect.

In summary, the coupling arrangement 42 thus has two defined sections 50, 56, which enable a function separation. More precisely, the second section 56 is designed in particular for the coupling to the position sensor element 44, whereas the first section 50 is provided primarily for the coupling to the carrier plate 40. Furthermore, the first section 50 provides the rotatory degree of the freedom of the coupling arrangement 42 relative to the carrier plate 40, whereas the second section 56 serves primarily for the fixed and in particular axially play-free connection to the position sensor element 44. As explained, the first section 50 is also arranged axially play-free on the carrier plate 40, however, and therefore supports the axially play-free coupling.

The following groups of figures A-C each contain similar depictions to the group of FIGS. 2A-C. In other words, in the figures designated A, a sectional view of an extract analogous to FIG. 2A is shown in each case. In the figures designated B, on the other hand, a depiction in perspective of this extract is shown. The figures designated C and in some cases additionally also D normally show the respective coupling arrangements 42 in depictions of single components (with the exception of FIG. 4C, for example).

Figure 3A:
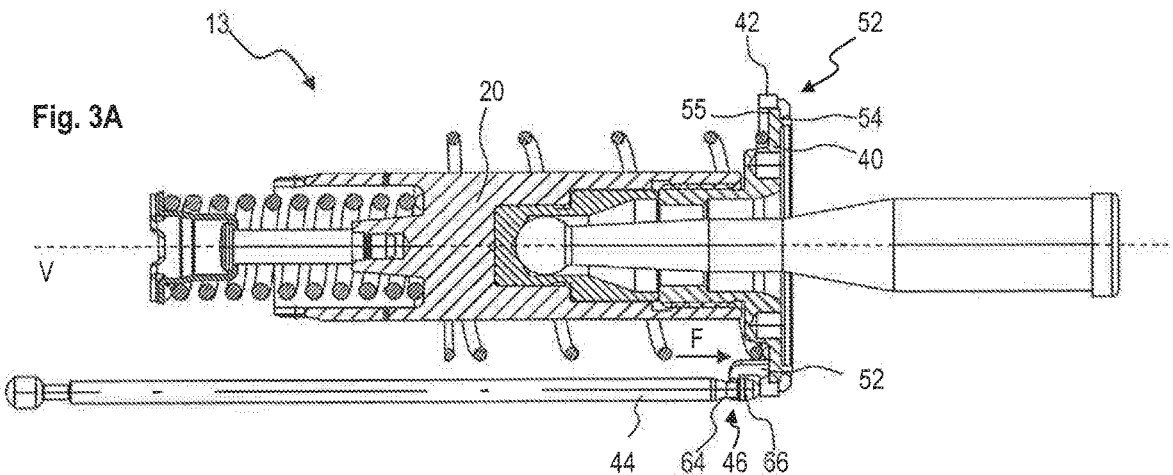
FIGS. 3A-D are views showing a coupling arrangement according to a second exemplary embodiment.
Figure 3B:
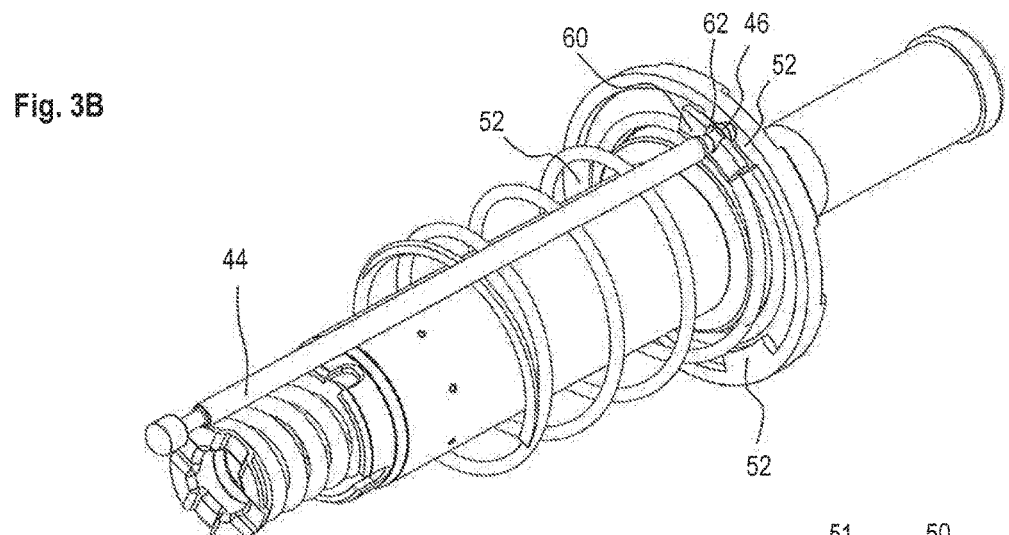
Figure 3C:
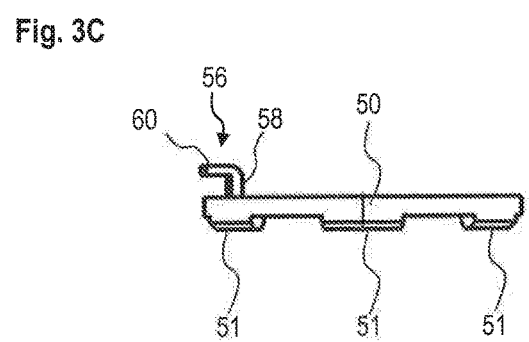
Figure 3D:
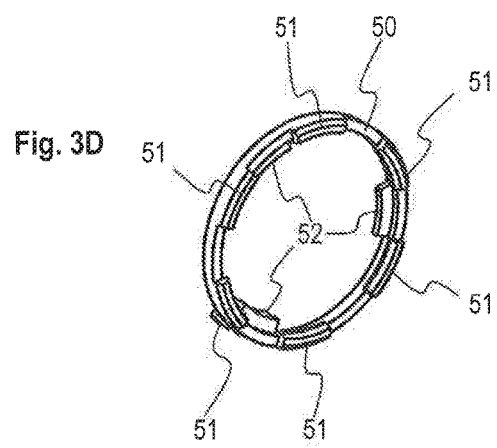

FIGS. 3A-C show a second exemplary embodiment. The piston arrangement 13, comprising a carrier plate 40, is recognised again. On its external circumferential surface there is again arranged a coupling arrangement 42, which facilitates a connection to the position sensor element 44. In detail the coupling arrangement 42 comprises a first section 50 for coupling to the piston arrangement 13 or the carrier plate 40, wherein this first section 50 is configured as a closed ring. As is recognised in FIG. 3D, there are formed on a side of the first section 50 facing away from the position sensor element 44 several first regions 51 protruding radially inwards. The same applies to a side facing the position sensor element 44, on which likewise several second regions 52 protruding radially inwards are formed.

The coupling arrangement 42 is manufactured from an elastically deformable plastic material. As is evident from the FIGS. 3A-B, it can be pushed or put axially over the carrier plate accordingly with elastic deformation, in order to be coupled to it in an axially play-free manner. To this end the carrier plate 40 comprises an external circumferential surface with enlarged diameter, which forms a coupling surface 52 for attaching the first section 50. In this coupling surface 52 there is provided a recess 54 running in a circumferential direction, which is formed stepped. By analogy with the previous exemplary embodiment, a diameter step 55 facing the position sensor element 44 is thus provided, which extends starting out from the recess 54.

The stepped structure formed by the recess 54 and diameter step 55 can be encompassed by the regions 51, 52 of the first section 50 that protrude radially inwards, so that the coupling arrangement 42 and the carrier plate 40 are coupled in an axially play-free manner. This can take place optionally also with a targeted setting of friction forces, for example by defining the degree of elastic deformation when arranging the first section 50 on the carrier plate 40. A sufficiently reliable fastening can be achieved by this without suppressing a relative rotatability of these elements about the movement axis V, however.

The second section 56 of the coupling arrangement 42 is again recognised in FIG. 3C. This again comprises an axial subsection 58 and a radial subsection 60. In this case, however, the radial subsection 60 extends radially outwards, starting from the axial subsection 58. The radial subsection 60 further comprises a recess 62 opening radially outwards. An end section 46 of the position sensor element 44 can accordingly be coupled to the second section 56 by a movement directed radially inwards. A form lock is again produced by this between the recess 62 and the end section 46, which by analogy with the previous example comprises a diameter step due to a region 64 of reduced diameter, which merges into an end piece 66 with enlarged diameter. In the depiction in FIG. 3A, the end piece 66 again abuts on the carrier plate 40. As in the previous case, this can be supported by an elastic deformation of the second section 56, wherein corresponding reset forces F can also act. It is also conceivable, however, to configure the example shown without such deformation and/or abutment.

As a result, an axially play-free and above all axially rigid coupling of position sensor element 44 and the piston arrangement 13 is again facilitated via the coupling arrangement 42, wherein a relative rotation about the movement axis V of the normally fixed position sensor element 44 in relation to the piston arrangement 13 is facilitated, however. This is made possible by means of a sliding of the first section 50 of the coupling arrangement 42 in a circumferential direction along the coupling surface 52.

Figure 4A:
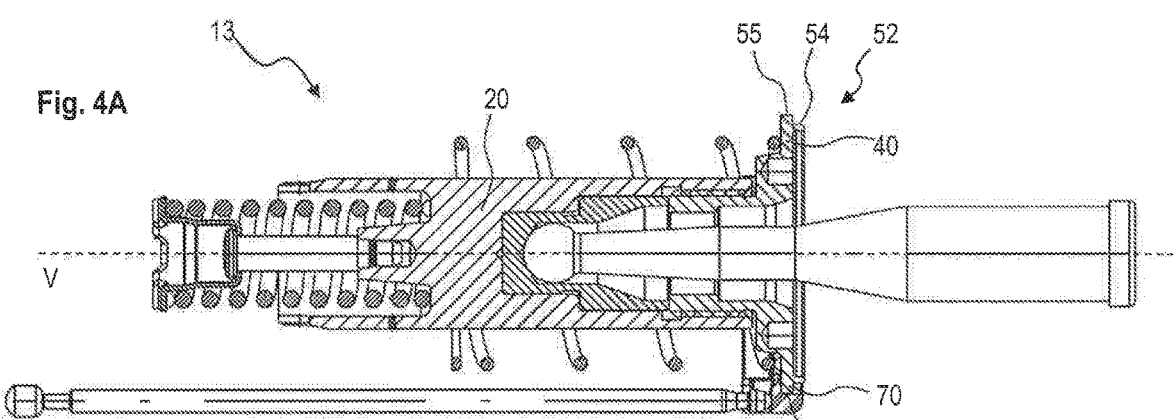
FIGS. 4A-C are views showing a coupling arrangement according to a third exemplary embodiment.
Figure 4B:
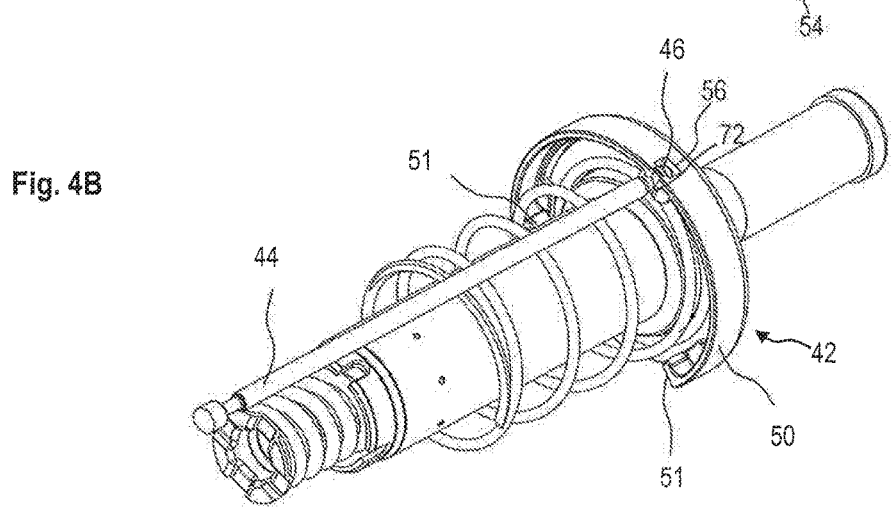
Figure 4C:
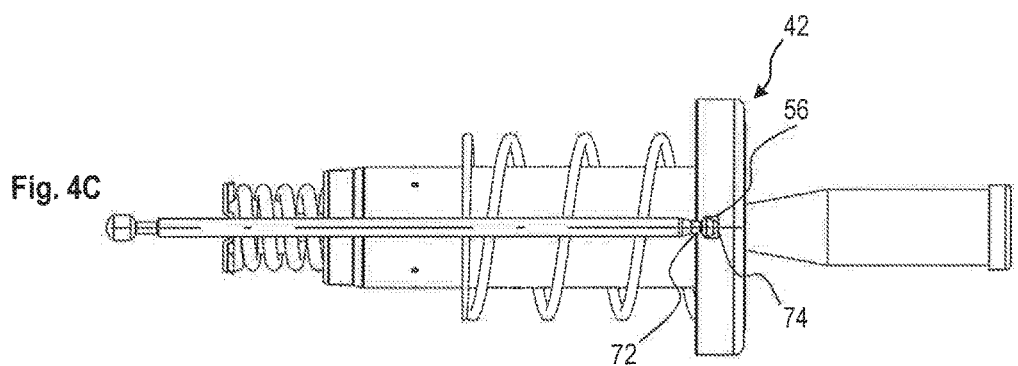

FIGS. 4A-C show a third exemplary embodiment. The piston arrangement 13 is configured here identical to the piston arrangement from FIG. 3A. The carrier plate 40 consequently again comprises an external circumferential surface with an enlarged diameter, which serves as a coupling surface 52 and comprises a circumferential recess 54 and a diameter step 55. The coupling arrangement 42 is formed, on the other hand, as an open ring by analogy with the first exemplary embodiment according to FIGS. 2A-C. In FIG. 4C in particular, however, it is recognised that the coupling arrangement 42 is configured with a much greater axial extension compared with the first exemplary embodiment.

The coupling arrangement 42 specifically comprises once again a first section 50, which is configured as a suitably open annular region. In FIG. 4B it is recognised further that in this case regions 51 protruding radially inwards are again provided on the free ends of the annular first section 50. These abut on a side of the carrier plate 40 facing the position sensor element 44. The first section 50 further comprises a recess 54 running around in a circumferential direction on an internal circumferential surface 70 facing the carrier plate. When the coupling arrangement 42 is pushed radially onto the carrier plate 40, this receives the diameter step 55 in an axially play-free manner. The coupling arrangement 42 is thus positioned axially play-free on the carrier plate 40 by way of the various regions 51 and the recess 54. This takes place additionally with a defined adjustment of friction forces, as the first section 50 is widened elastically during arrangement on the carrier plate 40. However, these friction forces do not completely prevent a relative rotation of coupling arrangement 42 and piston arrangement 13 about the movement axis V.

The connection of coupling arrangement 42 and position sensor element 44 again takes place via a second section 56. In the case shown, this is configured as a recess in the first section 50. This recess extends in particular in an axial direction and thus provides a free space, in which the end section 46 of the position sensor element 44 can be received. The second section 56 further comprises an axial input region 72, which is configured with a reduced cross section and thus provides an undercut. This can interact with a diameter step of the end section 46 of the position sensor element 44, which section is configured by analogy with the previous examples, in order to provide an axial form lock and thus an axially rigid coupling between the position sensor element 44 and the coupling arrangement 42.

In FIG. 4C it is recognised that this is again accompanied by an optional abutment of the end section 46 on an end face 74 of in this case the coupling arrangement 42. This can also be supported by possible reset forces acting axially due to a deformation of the second section 56.

Overall the coupling arrangement 42 thus again facilitates an axially rigid coupling of position sensor element 44 and piston arrangement 13, but also provides a rotatory decoupling of these elements about the movement axis V.

Other exemplary embodiments are discussed below. It is common to each of these that the coupling arrangement 42 facilitates the axially rigid coupling already explained above of position sensor element 44 and piston arrangement 13 with simultaneous rotatory decoupling about the movement axis V in this case also. Likewise in this case, unless otherwise indicated, optional abutments of the end section 46 of the position sensor element 44 on the carrier plate 40, the coupling arrangement 42 or other elements can be provided respectively, which can be supported in turn by possible reset forces due to elastic deformation of the coupling arrangement 42.

Figure 5A:
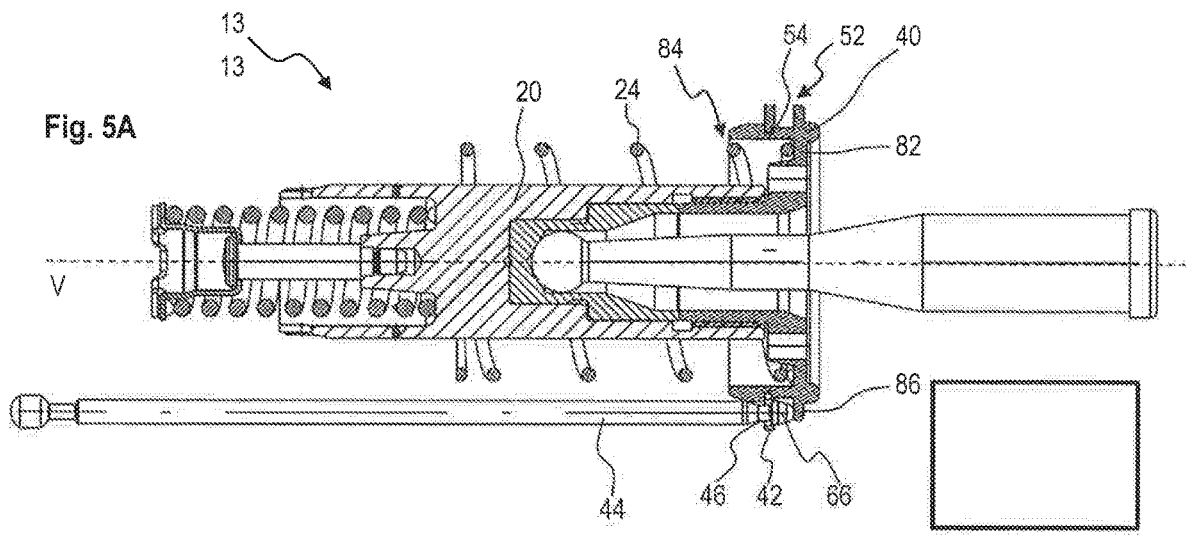
FIGS. 5A-C are views showing a coupling arrangement according to a fourth exemplary embodiment.
Figure 5B:
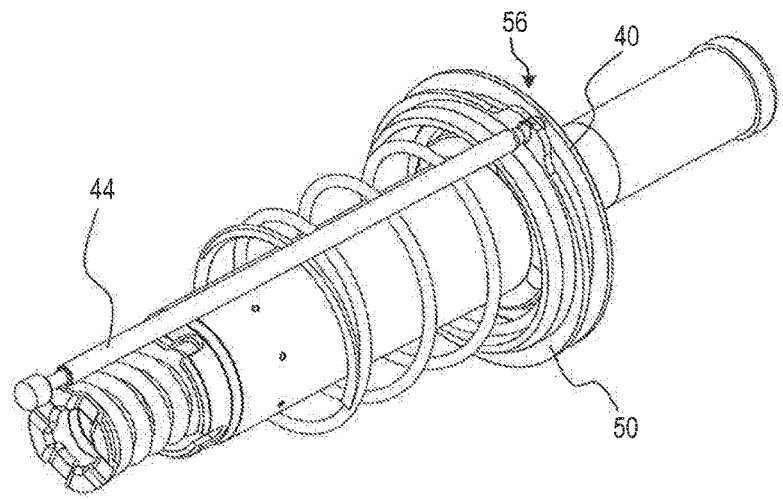
Figure 5C:
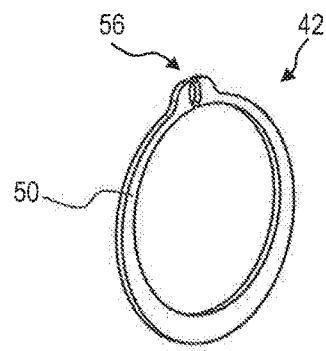

FIGS. 5A-C show a fourth exemplary embodiment. With the exception of the carrier plate 40, the piston arrangement 13 is configured by analogy with the previous example. It is recognised that in this case the carrier plate 40 has an enlarged axial extension in its enlarged diameter region compared with the previous examples. Specifically the carrier plate 40 comprises a radially outer annular section 80 running around in a circumferential direction.

Starting out from a disc-shaped base section 82 running orthogonally to the movement axis V, the annular section 80 extends axially along the movement axis V and in the direction of the pressure chamber 28, which is not shown in FIG. 5A. It accordingly forms a hollow cylindrical receiving section 84 of the carrier plate 40, in which the reset spring 24 positioned close to input opening 36 (see FIG. 1) can be taken up in sections. More precisely, an end of the reset spring 24 facing the input opening 36 is supported on the base section 82 and is spanned axially in sections by the annular section 80.

There is provided on the annular section 80 an external circumferential surface, which serves as a coupling surface 52 for interacting with the coupling arrangement 42. By analogy with the first exemplary embodiment according to FIGS. 2A-C, a recess 54 running around in a circumferential direction is provided in the coupling surface 52 in the form of a groove. A first section 50 of the coupling arrangement 42 is received in this in an axially play-free manner. For this purpose the coupling arrangement 42 comprises a first section 50, which is configured as an open ring. The opening in this ring spans an angular range of less than 10° and defines the second section 56 for coupling to the position sensor element 44.

The coupling arrangement 42 can be arranged in the recess 54 of the carrier plate 40 with widening of the first section 50, wherein defined friction forces can also be set (see analogous discussion regarding previous examples). To this end the coupling arrangement 42 can be pushed radially onto the carrier plate 40. The end section 46 of the position sensor element 44 can then be pushed axially through the opening in the first section 50 that forms the second section 56. The first section 50 is widened slightly to do this also. Due to the diameter step in the end section 46, which is configured by analogy with the previous examples, the first section 50 narrows, however, as soon as the end piece 66 of the position sensor element 44 has been pushed through the opening. In other words, the first section 50 snaps together again behind the end piece 66, so that an axial form lock is created. In addition the end piece 66 (optionally) comes into abutment with a diameter step 86 of the carrier plate 40, in order to secure the axial position of the position sensor element 44 (see FIG. 5A). The rotatory decoupling takes place, on the other hand, again via a relative sliding of the first section 50 of the coupling arrangement 42 along the recess 54 of the carrier plate 40.

Figure 6A:
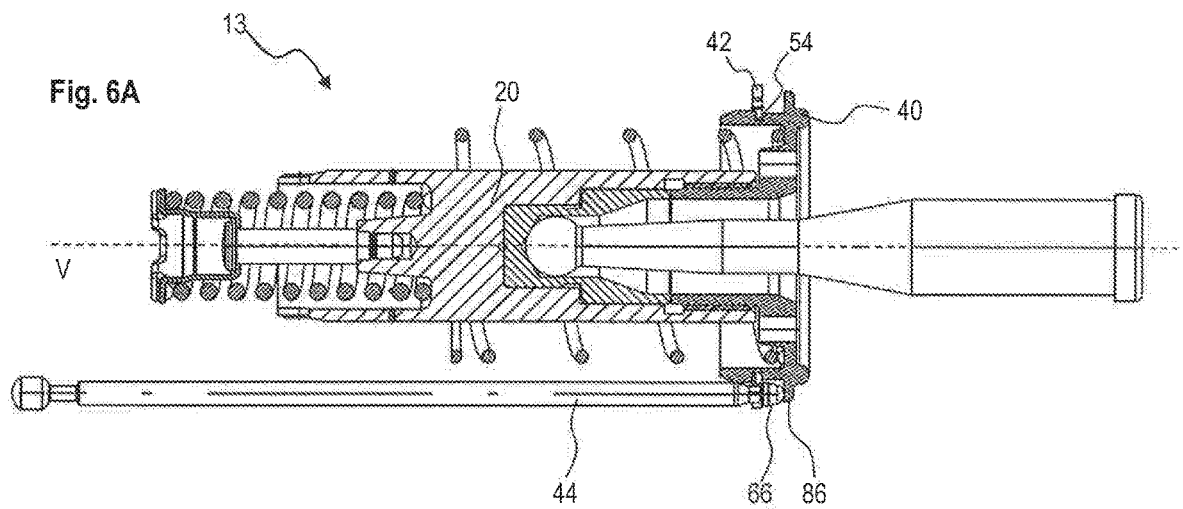
FIGS. 6A-C are views showing a coupling arrangement according to a fifth exemplary embodiment.
Figure 6B:
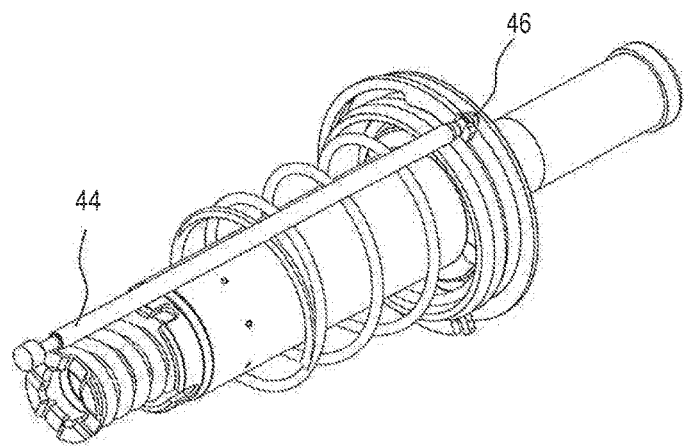
Figure 6C:
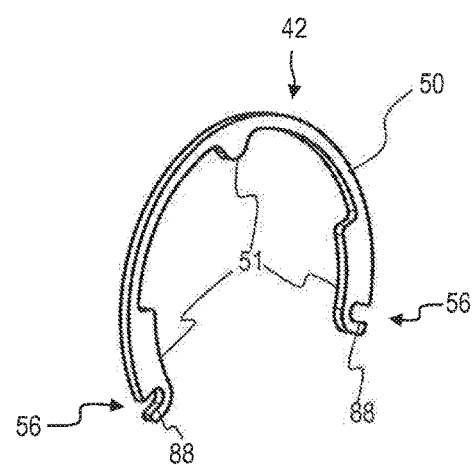

FIGS. 6A-C show a fifth exemplary embodiment. This comprises a carrier plate 40 configured by analogy with the fourth exemplary embodiment. The coupling arrangement 42, on the other hand, is configured as an open ring, which is inserted axially play-free into the circumferential recess 54 of the carrier plate 40. In detail the coupling arrangement 42 comprises a first section 50, which defines an open annular section. Here the first section 50 spans an angular range of approx. 240°. The first section 50 has three regions 51 projecting radially inwards along its circumference. These are arranged respectively at the free ends of the first section 50 and a third region 51 is positioned centrally in between. The protruding regions 51 form guide surfaces, which interact with the base of the recess 54. The arranging of the coupling arrangement 42 in the recess 54 again takes place via an elastic widening of the first section 50, in order to set predetermined friction forces, which continue to facilitate a relative rotation between the carrier plate 40 and the coupling arrangement 42 about the movement axis V, however.

To receive the end section 46 of the position sensor element 44, there are formed in the free end regions of the first section 50 recesses 88 extending radially inwards in each case, into which the end section 46 can be moved radially. These recesses 88 each form a second section 56 for connecting the coupling arrangement 42 and position sensor element 44. In principle, such a recess 88 in just one of the end regions suffices here. The recesses 88 can optionally also be elastically deformed (for example by widening) during coupling to the position sensor element 44 to guarantee a secure connection.

The recess 88 brought into engagement forms an axial form lock jointly with the end piece 66 of the position sensor element 44, wherein the end piece 66 again comes into abutment with a diameter step 86 of the carrier plate 40 (see FIG. 6A). The axial fixing of the end section 46 thus corresponds to that of the previous fourth exemplary embodiment. On the other hand, rotatory decoupling is again facilitated by a relative sliding of the first section 50 along the recess 54.

Figure 7A:
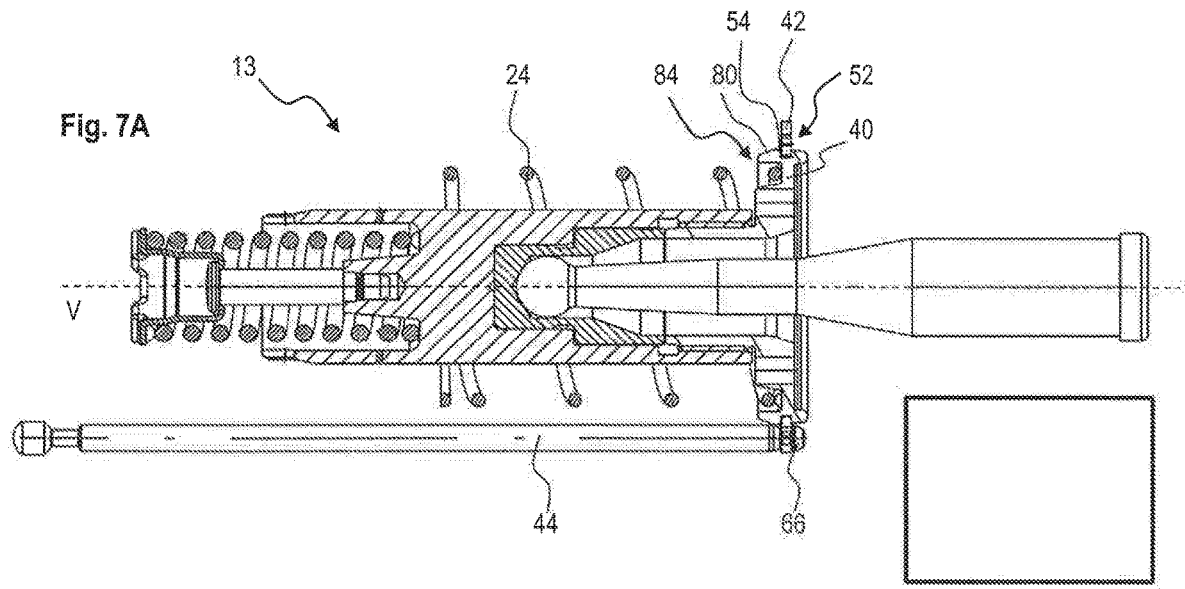
FIGS. 7A-B are views showing a coupling arrangement according to a sixth exemplary embodiment.
Figure 7B:
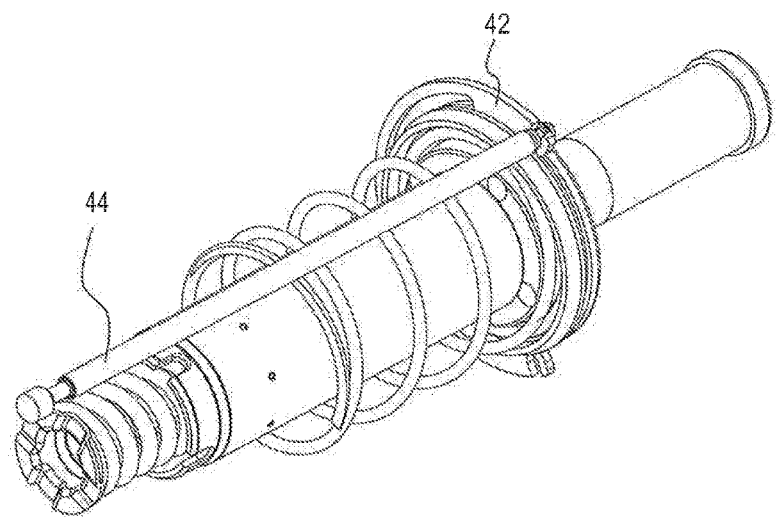

FIGS. 7A-B show a sixth exemplary embodiment. In this case the coupling arrangement 42 is configured by analogy with the fifth initial example, which is why this is not explained in greater detail. However, a difference exists to the effect that no abutment of the end piece 66 of the position sensor element 44 on the carrier plate 40 is provided, as this is positioned radially outside of the carrier plate 40. Compared with the sixth exemplary embodiment, the carrier plate 40 is itself configured with an axially shortened annular section 80, which again provides a receiving region 84 for the reset spring 24, however. To receive the coupling arrangement 42, the carrier plate 40 again comprises an external circumferential surface, which forms a coupling surface 52. A circumferential recess 54 is provided in this in the form of a groove, in which the coupling arrangement 42 is received by analogy with the fourth exemplary embodiment.

Figure 8A:
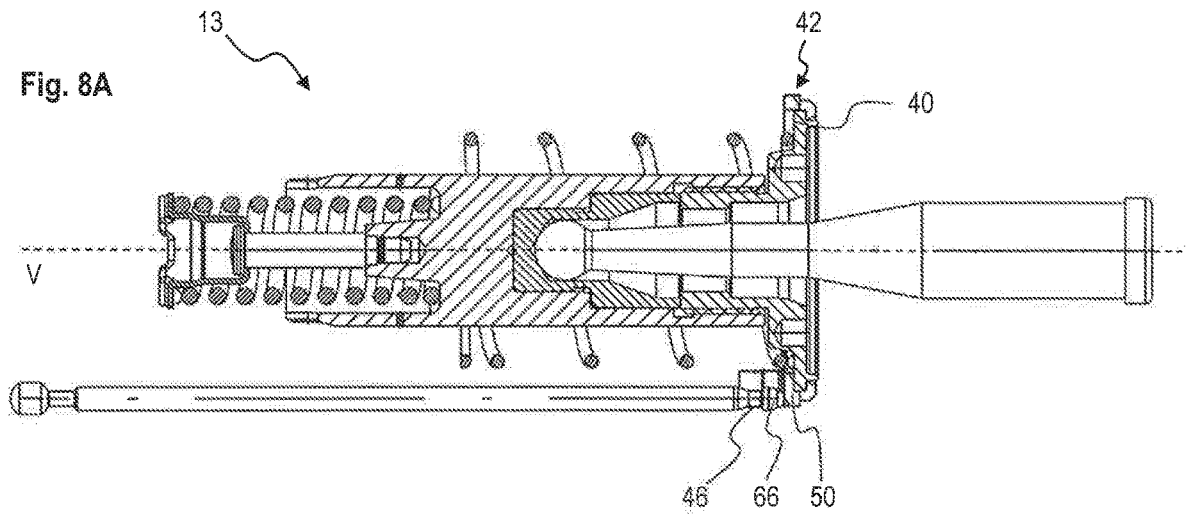
FIGS. 8A-D are views showing a coupling arrangement according to a seventh exemplary embodiment.
Figure 8B:
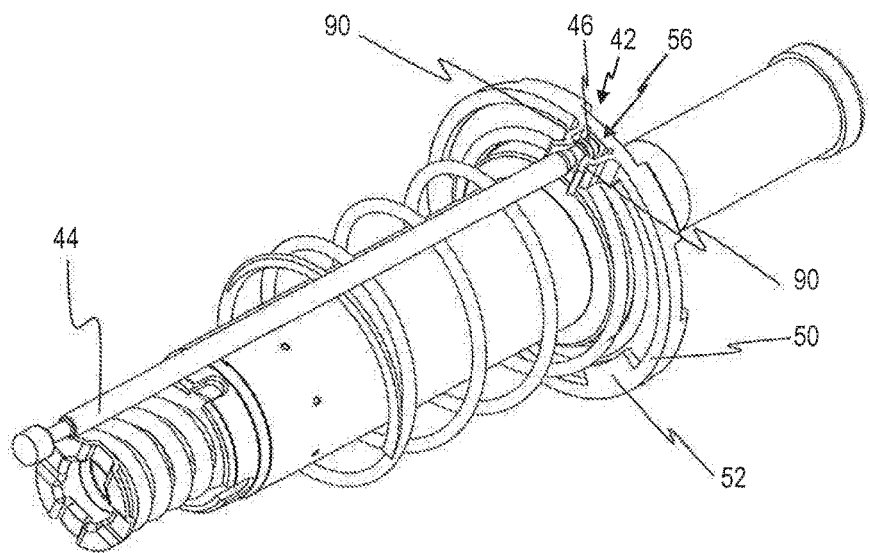
Figure 8C:
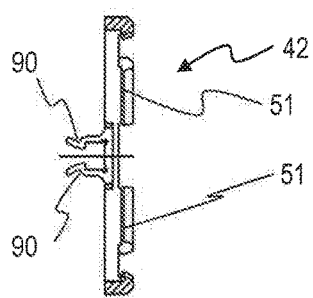

FIGS. 8A-C show a seventh exemplary embodiment. In this case the piston arrangement 13 including the carrier plate 40 is configured by analogy with the second exemplary embodiment. The same applies to the first section 50 of the coupling arrangement 42, which is again configured with the radially inwardly protruding regions 51, 52 explained by means of FIGS. 3A-D. The coupling arrangement 42 is, as described above, fastened in an axially play-free manner to the carrier plate 40 via these regions 51, 52.

The coupling to the position sensor element is achieved via a second section 56, which is configured as a clamping section protruding axially from the first section 50. The second section 56 specifically comprises two opposing clip sections 90, which extend axially in the direction of the position sensor element 44 and form a receiving region for the end section 46 of the position sensor element 44. This end section 46 can be pushed axially into the second section 56 with elastic pressing apart of the clip sections 90. Due to the diameter step in the end section 46, which is configured by analogy with the second example, the clip sections 90 narrow again, however, as soon as the end piece 66 has been fully introduced. At their axially free ends the clip sections 90 each comprise an undercut region, which thereupon engages with the diameter step in the end section 46 and forms an axial form lock. In FIG. 8A it is recognised again that the end piece 66 is (optionally) in abutment with an opposing end face of the first section 50 of the coupling arrangement 42.

With regard to the other features and the mode of operation of the example shown, reference is made to the previous explanations relating to the second exemplary embodiment.

Figure 8D:
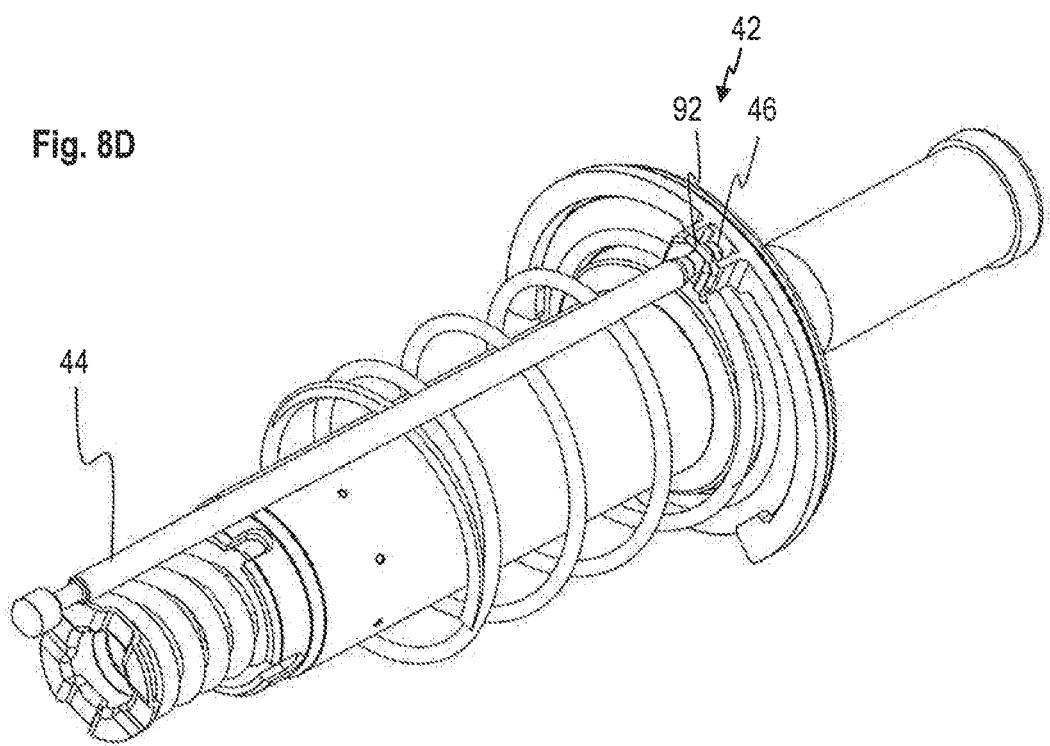

FIG. 8D shows another variant of the seventh exemplary embodiment. In this case an additional fastening element in the form of a retaining clip 92 is provided. This is configured as a bent wire element and is pushed onto the axial ends of the clip sections 90, in order to push these additionally towards one another. An additional fastening force is produced by this, which reinforces the engagement or form lock between the end section 46 and the coupling arrangement 42 as well as the axially rigid coupling between these.

Figure 9A:
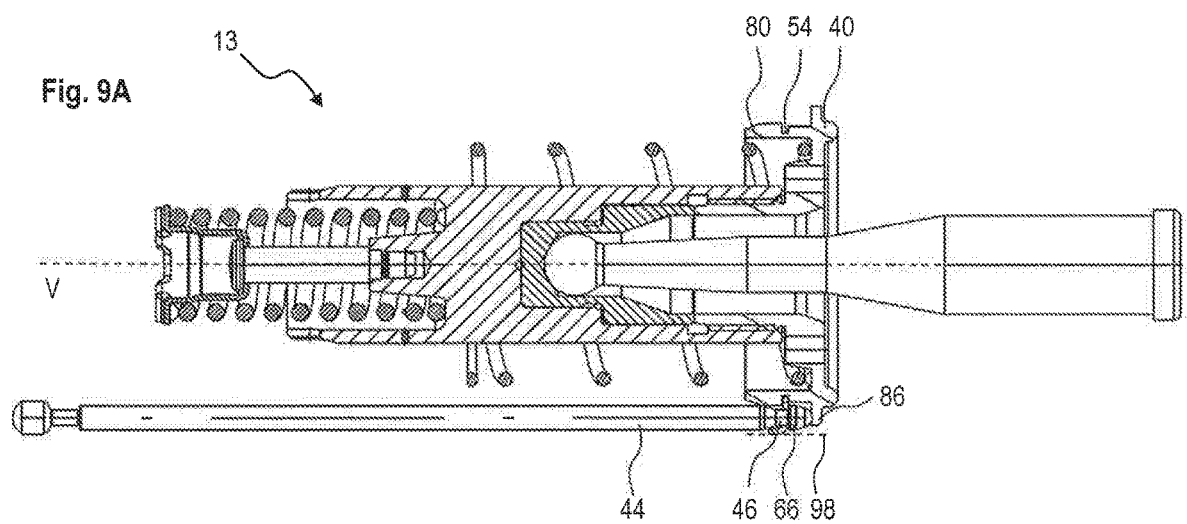
FIGS. 9A-C are views showing a coupling arrangement according to an eighth exemplary embodiment.
Figure 9B:
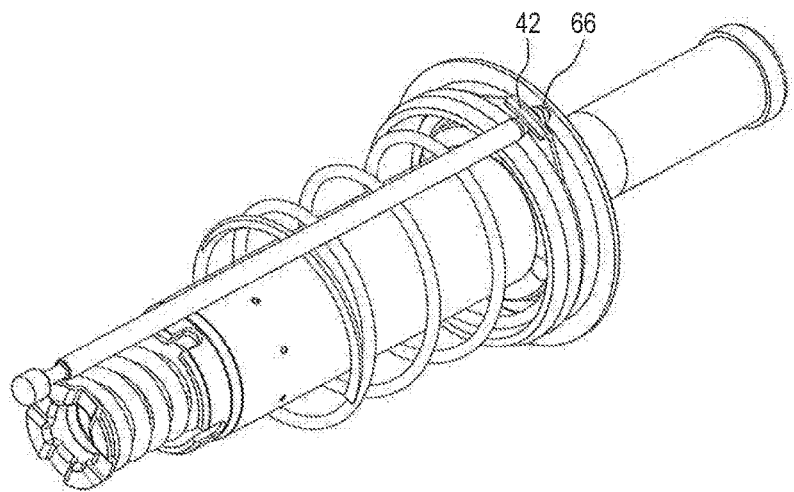
Figure 9C:
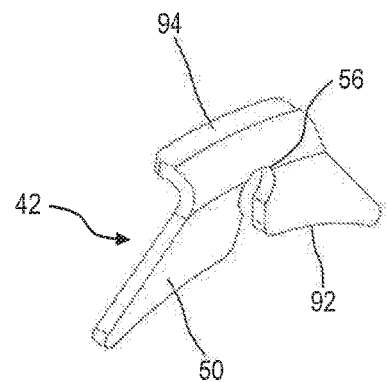

FIGS. 9A-C show an eighth exemplary embodiment. In this case the piston arrangement 13 is configured by analogy with the fourth exemplary embodiment according to FIGS. 5A-C and has an annular section 80 as well as a recess 54 running around in a circumferential direction. A coupling arrangement 42 is again received in this. However, compared with the previous initial examples this is configured with a much smaller size. Specifically the coupling arrangement 42 is configured as a one-piece sheet metal bent part, which comprises a first section 50 with a rounded underside 92 facing the recess 54. This underside 92 provides a guide surface, by means of which the coupling arrangement 42 abuts on the base of the recess 54 and is movable along this in a circumferential direction (and thus about the movement axis V) relative to the carrier plate 40. The recess 54 is further dimensioned so that the coupling arrangement 42 is received therein in an axially play-free manner.

The second section 56 of the coupling arrangement 42 for coupling to the position sensor element 44 is configured as a recess that is open radially inwards. The end section 46 of the position sensor element 44 can be received in this by analogy with the first exemplary embodiment with the formation of an axial form lock. The coupling arrangement 42 is then inserted into the recess 54. In FIG. 9A it is recognised that this again takes place with the end piece 66 of the position sensor element 44 being brought into abutment with a diameter step 86 of the carrier plate 40.

The coupling arrangement 42 is again configured to decouple the carrier plate 40 and the position sensor element 44 in rotatory terms, as the coupling arrangement 42 can slide along the recess 54. To secure the radial position of the coupling arrangement 42, this further comprises a contact section 94 facing away from the underside 92, which section is formed by an axially bent region of the coupling arrangement 42. This contact section 94 is in contact with a housing wall 98 of the brake master cylinder arrangement 10, which wall is indicated in FIG. 9A by a dashed line. A radial relative movement between the coupling section 42 and the carrier plate 40 and in particular a radial falling of the coupling section 42 out of the recess 54 is thus prevented.

Returning to FIG. 1, it is recognised that the housing wall 98 is formed by a hollow cylindrical cover element 100 receiving the movement axis V coaxially. The contact section 94 accordingly always remains in contact, independently of its current position along the recess 54, with an opposing region of the housing wall 98, thus, for example, even in an upper position close to the reference sign 54 in FIG. 9A.

Figure 10A:
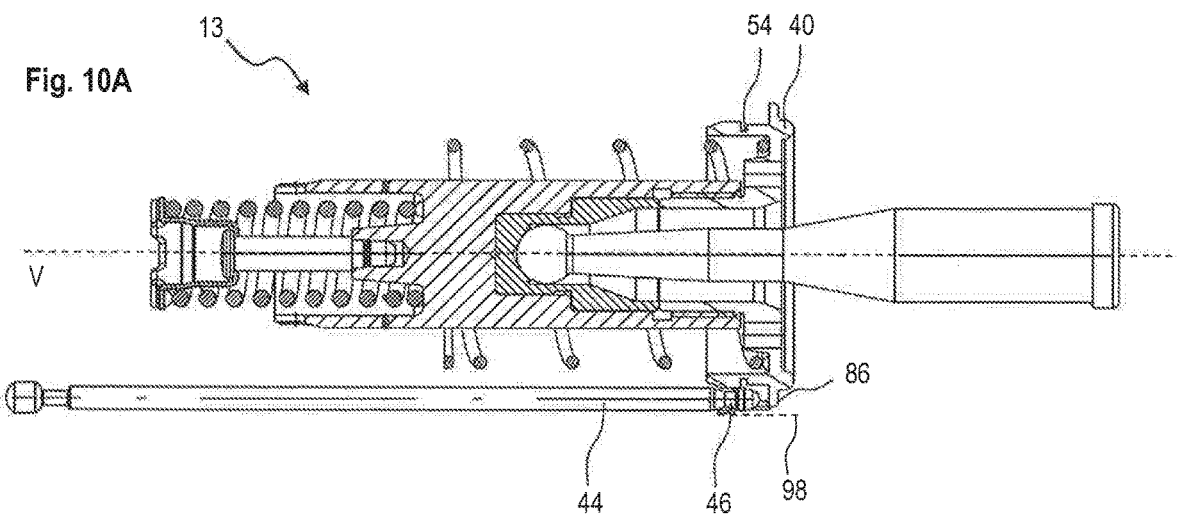
FIGS. 10A-C are views showing a coupling arrangement according to a ninth exemplary embodiment.
Figure 10B:
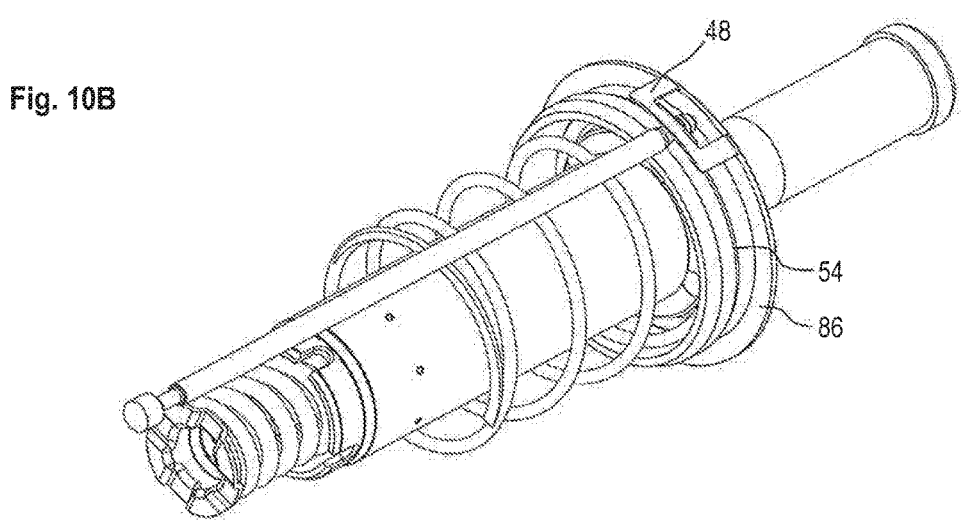
Figure 10C:
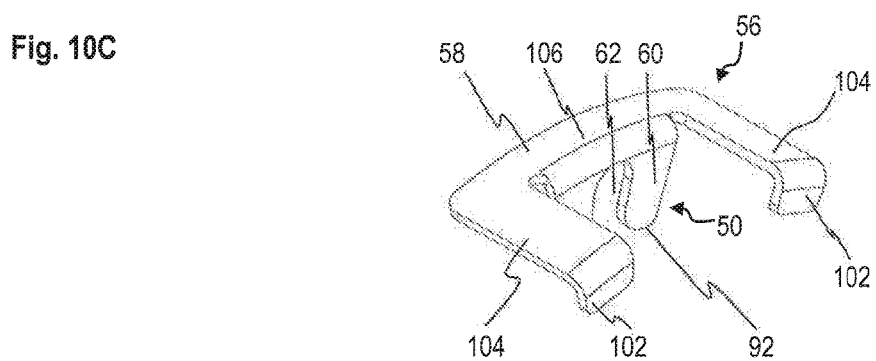

FIGS. 10A-C show a ninth exemplary embodiment. This represents a comparable variant to the eighth exemplary embodiment. In particular, the piston arrangement 13 including the carrier plate 40 is again configured by analogy with the fourth exemplary embodiment according to FIGS. 5A-C.

The coupling arrangement 42 is again configured with a reduced size, however. In this case the first section 50 comprises a much shorter underside 92, which is received in the recess 54 axially play-free and relatively movable in a circumferential direction. The first section 50 merges directly into a radial subsection 60 of a second section 56 of the coupling arrangement 42, which section comprises a recess 62 opening radially inwards by analogy with the first exemplary embodiment. The second section 56 further comprises an axial subsection 58. This comprises two angled retaining sections 102, which abut on a side of the diameter step 86 of the carrier plate 40 facing away from the position sensor element 44. An arm section 104 running axially extends in each case starting out from the retaining sections 102. At their ends facing away from the retaining sections 102, the arm sections 104 are connected by a circumferential section 106. The radial subsection 60 of the second section 56 in turn extends starting out from this.

The axial position of the coupling arrangement 42 on the carrier plate 40 is secured by the first section 50, but supported also by the retaining sections 102. Thus an axially play-free as well as axially rigid coupling of position sensor element 44 and piston arrangement 13 is again achieved via the coupling arrangement 42, which is movable, however, about the movement axis V relative to the carrier plate 40.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. A brake master cylinder arrangement for a motor vehicle brake system, comprising at least one piston arrangement with:
   a pressure piston unit, which can be moved along a movement axis and delimits a pressure chamber together with a housing arrangement,
   a force input member, which is movable according to a brake pedal actuation and is coupled or can be coupled to the pressure piston unit for common movement,
   wherein the brake master cylinder arrangement further comprises:
   a position sensor element, which is movable according to an actuation of the force input member;
   a detection unit, which is configured to detect a movement of the position sensor element; and
   a coupling arrangement, which is configured to couple the position sensor element to at least one element of the piston arrangement along the movement axis in a substantially rigid manner, wherein the coupling arrangement is further adapted to permit a rotation of the piston arrangement relative to the position sensor element about the movement axis,
   wherein the coupling arrangement comprises a first section, which is configured to couple the coupling arrangement to the at least one element of the piston arrangement,
   wherein the first section is configured to interact with a coupling surface of the piston arrangement and in particular to slide relative to this,
   wherein the coupling surface is configured in a region of the piston arrangement that has a larger diameter than a section of the pressure piston unit delimiting the pressure chamber.

2. The brake master cylinder arrangement according to claim 1, wherein the coupling surface is configured on a carrier element, which is arranged on an end region of the piston arrangement facing away from the pressure chamber.

3. The brake master cylinder arrangement according to claim 1, wherein at least one of the first section and the coupling surface is formed with a recess, in which the respectively other of the first section and coupling surface is received at least partially, and in particular, wherein the recess comprises a groove running in a circumferential direction.

4. The brake master cylinder arrangement according to any one of claim 1, wherein the first section is or can be coupled to the piston arrangement with elastic deformation.

5. The brake master cylinder arrangement according to claim 1, wherein the first section comprises an annular region, which spans an angular range of at least approx. 120°.

6. The brake master cylinder according to claim 1, wherein the coupling arrangement comprises a second section, which is configured to couple the coupling arrangement to the position sensor element.

7. The brake master cylinder arrangement according to claim 6, wherein the second section is configured to form a form lock with the position sensor element, wherein the form lock limits in particular an axial relative movement of coupling arrangement and position sensor element.

8. The brake master cylinder arrangement according to claim 6, wherein the second section is configured to form a force fit with the position sensor element, in particular wherein the position sensor element is couplable to the coupling arrangement with at least local elastic deformation of the second section.

9. The brake master cylinder arrangement according to claim 6, wherein the second section protrudes axially compared with the first section or wherein the second section is formed by a recess region in the first section.

10. The brake master cylinder arrangement according to claim 6, wherein the position sensor element is couplable according to at least one of the following variants to the second section:
    axial movement inwards into the second section; and
    radial movement inwards into the second section.

11. The brake master cylinder arrangement according to claim 6, wherein the position sensor element comprises an end section, which is configured to interact with the second section of the coupling arrangement.

12. The brake master cylinder arrangement according to claim 11, wherein the second section spans the end section at least partially axially.

* * * * *